US008054306B2

(12) United States Patent
Chiang et al.

(10) Patent No.: US 8,054,306 B2

(45) Date of Patent: Nov. 8, 2011

(54) CIRCUIT PROVIDING COMMON VOLTAGE FOR PANEL OF DISPLAY

(75) Inventors: Cheng-Lung Chiang, Tainan County (TW); Chin-Chan Chang, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 1034 days.

(21) Appl. No.: 11/937,230

(22) Filed: Nov. 8, 2007

(65) Prior Publication Data

US 2009/0122044 A1 May 14, 2009

(51) Int. Cl.
*G06F 3/038* (2006.01)
*G09G 5/00* (2006.01)

(52) U.S. Cl. ........... 345/211; 345/98; 323/311; 327/560

(58) Field of Classification Search .................... 345/87, 345/94, 98–100, 211–213; 323/311, 313; 327/560, 563; 330/250, 252, 255
See application file for complete search history.

(56) References Cited

U.S. PATENT DOCUMENTS

| | | | | |
|---|---|---|---|---|
| 6,600,466 | B1 * | 7/2003 | Rosenquist | 345/87 |
| 6,710,773 | B2 * | 3/2004 | Jenkins et al. | 345/211 |
| 6,762,565 | B2 * | 7/2004 | Kudo et al. | 315/169.2 |
| 7,136,039 | B2 * | 11/2006 | Bu et al. | 345/98 |
| 7,289,116 | B2 * | 10/2007 | Tanaka | 345/211 |
| 7,551,024 | B2 * | 6/2009 | Sutardja | 330/98 |
| 7,812,805 | B2 * | 10/2010 | Miura | 345/96 |
| 2005/0195149 | A1 * | 9/2005 | Ito | 345/98 |
| 2008/0150930 | A1 * | 6/2008 | Nam et al. | 345/212 |

* cited by examiner

*Primary Examiner* — Kimnhung Nguyen

(57) ABSTRACT

A circuit providing a common voltage for a panel of a display includes a first operational amplifier, a second operational amplifier, a third operational amplifier, a capacitor and a switch circuit. The first operational amplifier outputs a first voltage. The second operational amplifier is powered by the first voltage and receives a polarity signal to output a second voltage. The third operational amplifier outputs a third voltage. The capacitor has a first end coupled to an output of the second operational amplifier and a second end coupled to an output of the third operational amplifier. The switch circuit couples the second end of the capacitor to the panel during a normal operation of the display, and couples one of a high constant voltage and a low constant voltage to the panel during a power saving operation of the display.

22 Claims, 3 Drawing Sheets

CIRCUIT PROVIDING COMMON VOLTAGE FOR PANEL OF DISPLAY

BACKGROUND

1. Field of Invention

The present invention relates to a circuit providing a voltage for a display. More particularly, the present invention relates to a circuit providing a common voltage for a panel of a display.

2. Description of Related Art

In a liquid crystal display (LCD), common voltages (VCOM) are usually provided to drive a panel and prevent material from aging, in which the common voltages can be separated into two types when applied, i.e. direct-current (DC) common voltages and alternating-current (AC) common voltages. Specifically, when the AC common voltages are applied, the AC common voltages with different voltage levels are alternatively generated to drive the panel.

However, the common voltages are required to be constant during the frame inversion of the liquid crystal display; that is, the common voltages have to be stable during the power saving operation of the liquid crystal display, so that the liquid crystal display can be successfully operated in the sleep or standby state. Therefore, problems may arise when the AC common voltages are applied during the power saving operation of the liquid crystal display.

SUMMARY

In accordance with one embodiment of the present invention, a circuit providing a common voltage for a panel of a display is provided. The circuit includes a first operational amplifier, a second operational amplifier, a third operational amplifier, a capacitor and a switch circuit. The first operational amplifier outputs a first voltage, and the second operational amplifier is powered by the first voltage and receives a polarity signal to output a second voltage. The third operational amplifier outputs a third voltage. The capacitor has a first end coupled to an output of the second operational amplifier and a second end coupled to an output of the third operational amplifier. The switch circuit couples the second end of the capacitor to the panel during a normal operation of the display, and couples one of a high constant voltage and a low constant voltage to the panel during a power saving operation of the display.

In accordance with another embodiment of the present invention, a circuit providing a common voltage for a panel of a display is provided. The circuit includes a first operational amplifier, a second operational amplifier, a capacitor, a switch unit, a third operational amplifier and a switch circuit. The first operational amplifier outputs a first voltage, and the second operational amplifier is powered by the first voltage and receives a polarity signal to output a second voltage. The capacitor has a first end and a second end, in which the second end of the capacitor is coupled to the panel. The switch unit couples an output of the second operational amplifier to the first end of the capacitor during a normal operation of the display and decouples the output of the second operational amplifier from the first end of the capacitor during a power saving operation of the display. The third operational amplifier outputs a third voltage. The switch circuit couples an output of the third operational amplifier to the second end of the capacitor during the normal operation of the display, and couples one of a high constant voltage and a low constant voltage to the second end of the capacitor during the power saving operation of the display.

For the foregoing embodiments of the present invention, the circuit can successfully provide an alternating-current (AC) common voltage for the panel during the normal operation of the display, and provide a constant voltage used as the common voltage for the panel during the power saving operation of the display. Therefore, the display driven by the AC common voltage can be operated well in the power saving state during the frame inversion for reducing the power consumption.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the preferred embodiment, with reference made to the accompanying drawings as follows.

DESCRIPTION OF THE PREFERRED EMBODIMENTS

Figure 1:
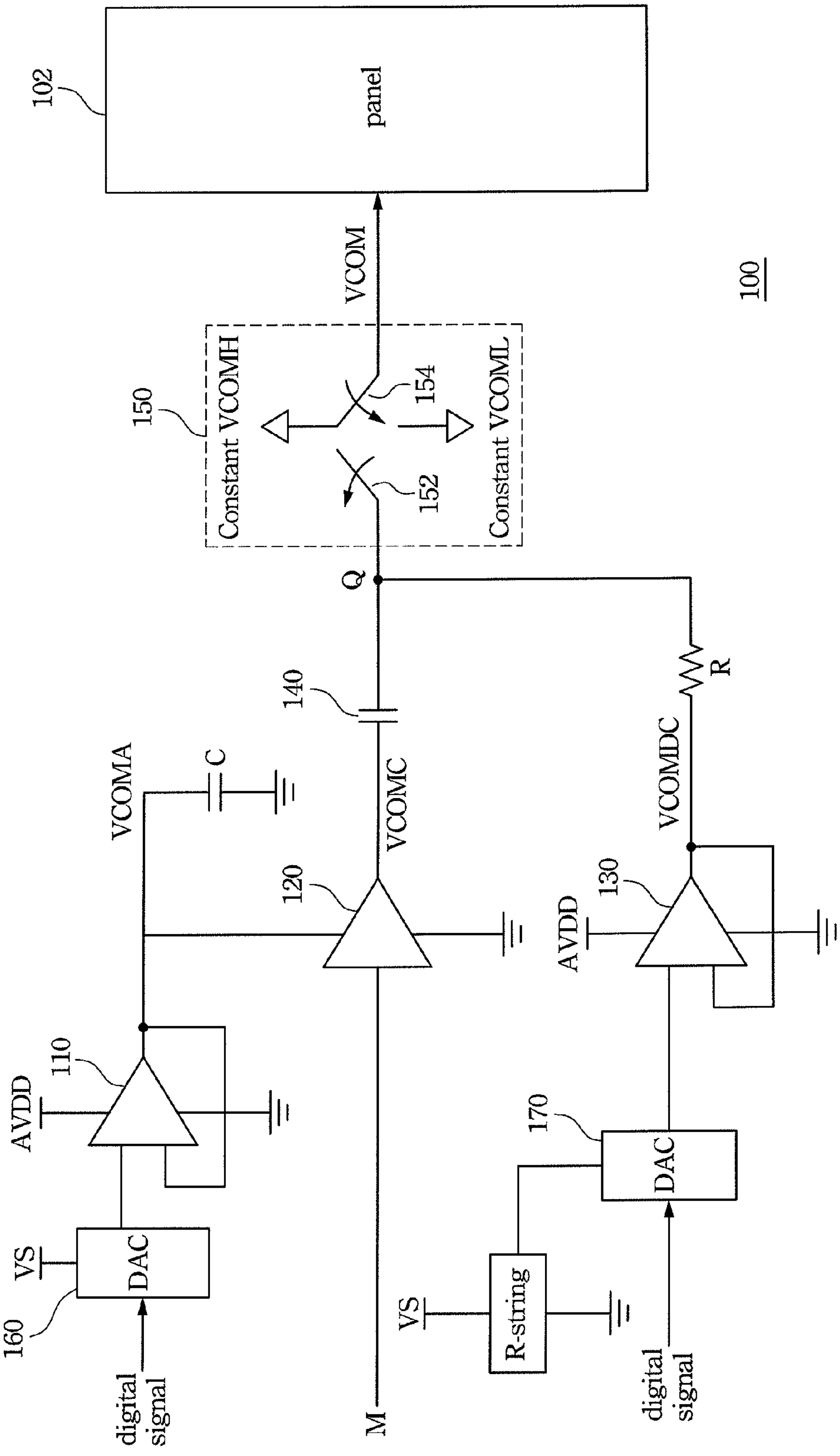
FIG. 1 shows a circuit providing a common voltage according to one embodiment of the present invention.

FIG. 1 shows a circuit providing a common voltage according to one embodiment of the present invention. The circuit 100 provides the common voltage VCOM for a panel 102 of a display. The circuit 100 includes a first operational amplifier 110, a second operational amplifier 120, a third operational amplifier 130, a capacitor 140, a switch circuit 150, a first digital-to-analog converter (DAC) 160 and a second digital-to-analog converter (DAC) 170. The first operational amplifier 110 is connected to the first DAC 160, and receives a first analog voltage output from the first DAC 160 to output a first voltage VCOMA, in which the first DAC 160 converts a digital signal, transmitted from a logic circuit (not shown), into the first analog voltage, and the voltage VCOMA is a constant voltage in the present embodiment. The second operational amplifier 120 is powered by the voltage VCOMA, and receives a polarity signal M to output a second voltage VCOMC, in which the value of the voltage VCOMC is alternated between 0 and VCOMA according to the polarity signal M. The third operational amplifier 130 is connected to the second DAC 170, and receives a second analog voltage output from the second DAC 170 to output a third voltage VCOMDC, in which the second DAC 170 converts another digital signal, transmitted from the logic circuit, into the second analog voltage, and the third voltage VCOMDC is a direct-current (DC) voltage in the present embodiment.

The capacitor 140 has a first end coupled to an output of the second operational amplifier 120 and a second end coupled to an output of the third operational amplifier 130 through a resistor R. Therefore, the voltage of the node Q, consisting of the voltages VCOMDC and VCOMC, is alternated between a high voltage (VCOMDC+VCOMA/2) and a low voltage (VCOMDC−VCOMA/2) according to an AC coupling process. The switch circuit 150 couples the second end of the capacitor 140 to the panel 102 during a normal operation of the display, such that the voltage of the node Q is used as the common voltage VCOM during the normal operation of the display. On the other hand, the switch circuit 150 couples one of a high constant voltage VCOMH and a low constant voltage VCOML to the panel 10 during a power saving operation of the display, such that one of the high constant voltage VCOMH and the low constant voltage VCOML is used as the common voltage VCOM during the power saving operation of the display, in which the high constant voltage VCOMH can be a power supply voltage and the low constant voltage VCOML can be a ground voltage, and the switch circuit 150 can be located in an integrated circuit (IC).

The switch circuit 150 can further include a first switch 152 and a second switch 154. The first switch 152 is connected to the second end of the capacitor 140. The second switch 154 couples the first switch 152 to the panel 102 during the normal operation of the display, and couples one of the high constant voltage VCOMH and the low constant voltage VCOML to the panel 102 during the power saving operation of the display.

During the normal operation of the display, the first switch 152 switches to turn on, and the second switch 154 switches to connect the second end of the capacitor 140 and the panel 102 through the first switch 152. During the power saving operation of the display, the first switch 152 switches to turn off, and the second switch 154 switches to couple one of the high constant voltage VCOMH and the low constant voltage VCOML to the panel 102, such that one of the high constant voltage VCOMH and the low constant voltage VCOML can be used as the common voltage VCOM. Furthermore, the second switch 154 can be set to switch to the high constant voltage VCOMH when the polarity signal M is at a high level and set to switch to the low constant voltage VCOML when the polarity signal M is at a low level.

Figure 2:
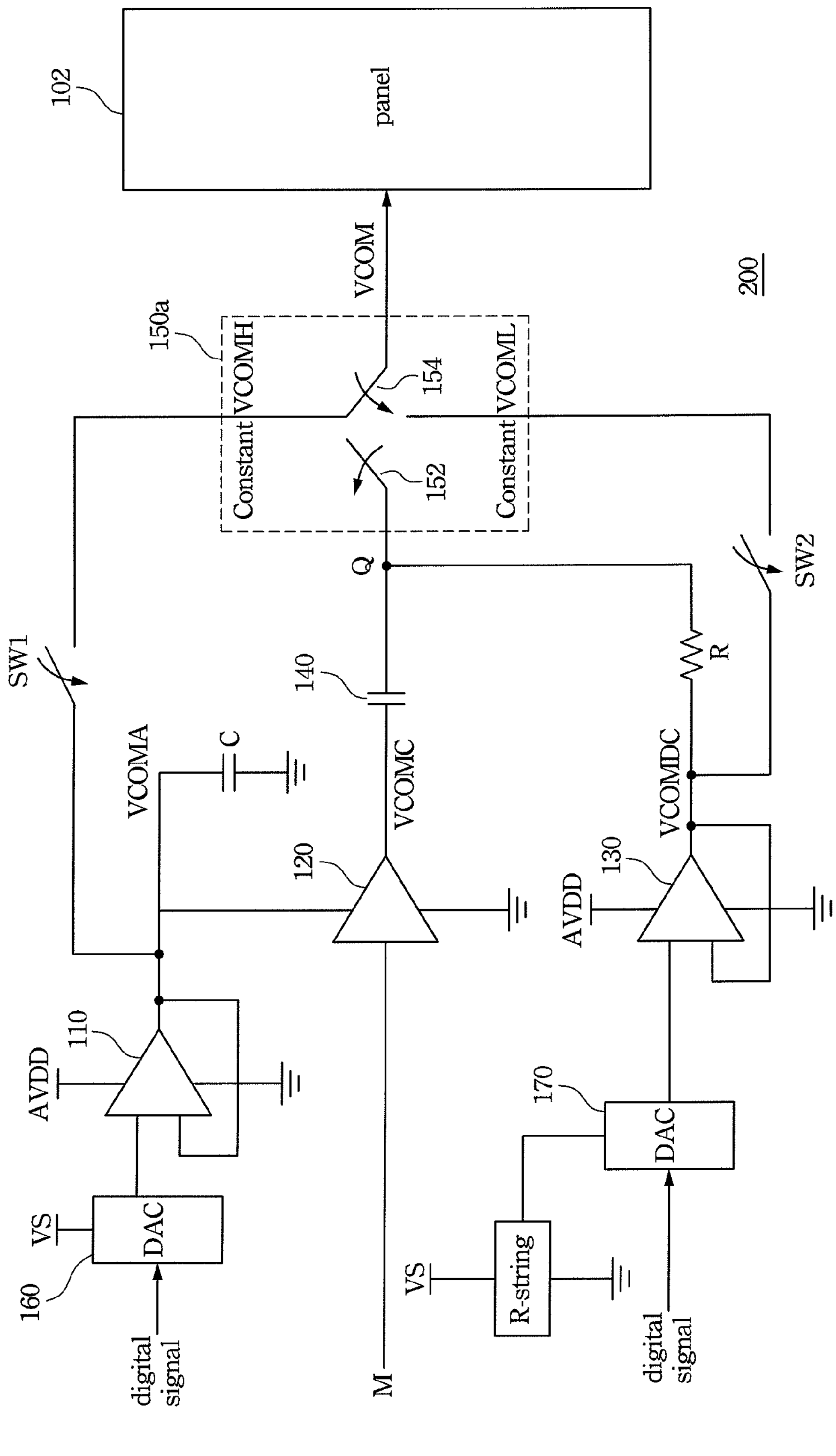
FIG. 2 shows a circuit providing a common voltage according to another embodiment of the present invention.

FIG. 2 shows a circuit providing a common voltage according to another embodiment of the present invention. Compared to FIG. 1, the switch circuit 150*a* can be connected to the output of the first operational amplifier 110 through a switch SW1 and connected to the output of the third operational amplifier 130 through a switch SW2, such that the first voltage VCOMA output from the first operational amplifier 110 is used as the high constant voltage VCOMH, and the third voltage VCOMDC output from the third operational amplifier 130 is used as the low constant voltage VCOML.

Figure 3:
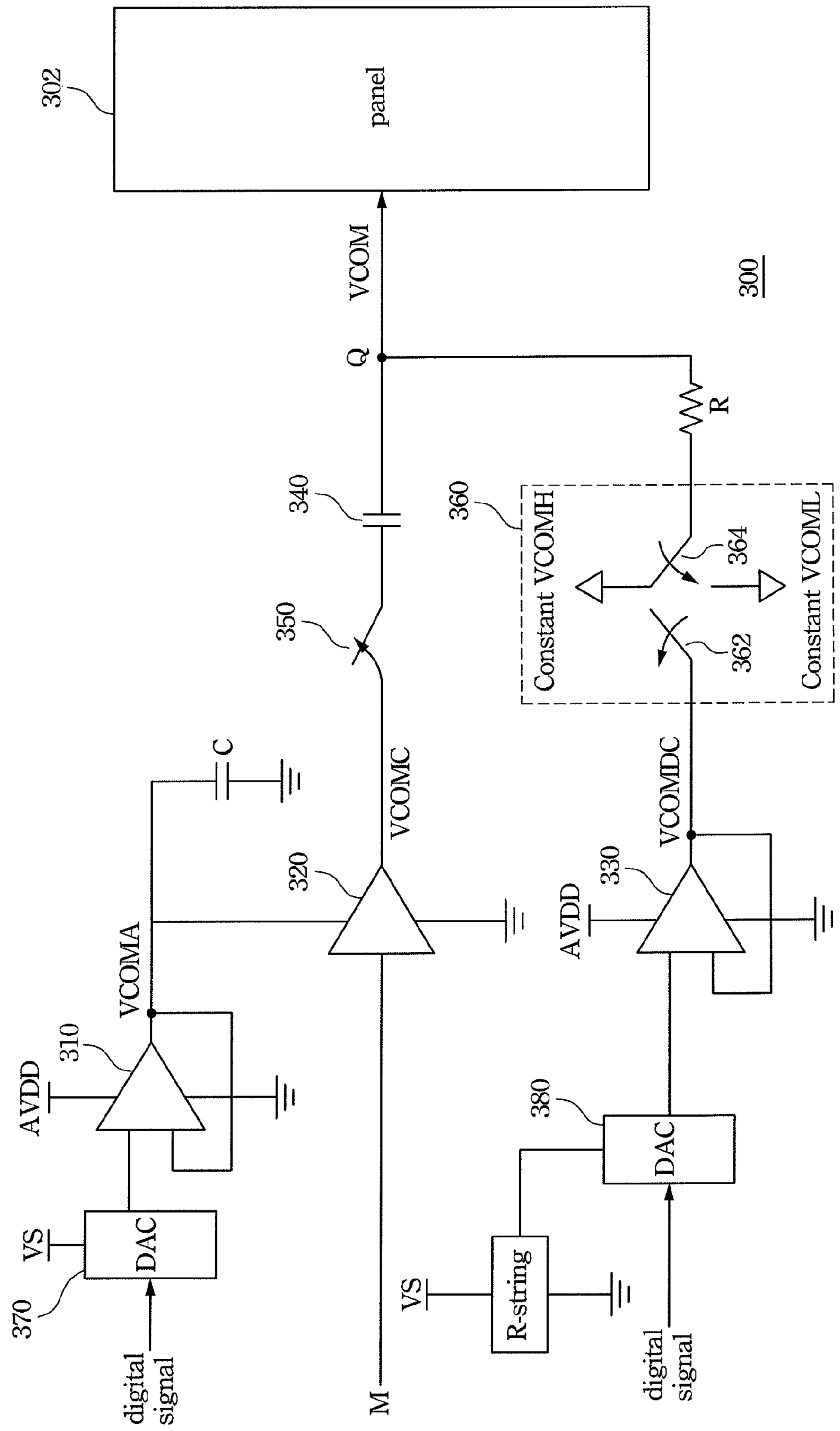
FIG. 3 shows a circuit providing a common voltage according to yet another embodiment of the present invention.

FIG. 3 shows a circuit providing a common voltage according to yet another embodiment of the present invention. The circuit 300 provides the common voltage VCOM for a panel 302 of a display, and includes a first operational amplifier 310, a second operational amplifier 320, a third operational amplifier 330, a capacitor 340, a switch unit 350, a switch circuit 360, a first digital-to-analog converter (DAC) 370 and a second digital-to-analog converter (DAC) 380. The first operational amplifier 310 is connected to the first DAC 370, and receives a first analog voltage output from the first DAC 370 to output a first voltage VCOMA, in which the first DAC 370 converts a digital signal, transmitted from a logic circuit (not shown), into the first analog voltage, and the voltage VCOMA is a constant voltage in the present embodiment. The second operational amplifier 320 is powered by the voltage VCOMA, and receives a polarity signal M to output a second voltage VCOMC, in which the value of the voltage VCOMC is alternated between 0 and VCOMA according to the polarity signal M. The third operational amplifier 330 is connected to the second DAC 380, and receives a second analog voltage output from the second DAC 380 to output a third voltage VCOMDC, in which the second DAC 170 converts another digital signal, transmitted from the logic circuit, into the second analog voltage, and the third voltage VCOMDC is a direct-current (DC) voltage in the present embodiment.

The capacitor 340 has a first end and a second end, in which the second end of the capacitor 340 is coupled to the panel 302. The switch unit 350 couples an output of the second operational amplifier 320 to the first end of the capacitor 340 during the normal operation of the display, and decouples the output of the second operational amplifier 320 from the first end of the capacitor 340 during the power saving operation of the display. The switch circuit 360 couples the output of the third operational amplifier 330 to the second end of the capacitor 340 through a resistor R during the normal operation of the display. Therefore, during the normal operation of the display, the voltage of the node Q, used as the common voltage VCOM and consisting of the voltages VCOMDC and VCOMC, is alternated between a high voltage (VCOMDC+VCOMA/2) and a low voltage (VCOMDC−VCOMA/2) according to the AC coupling process. On the other hand, the switch circuit 360 couples one of a high constant voltage VCOMH and a low constant voltage VCOML to the second end of the capacitor 340 during the power saving operation of the display, in which the high constant voltage VCOMH can be a power supply voltage and the low constant voltage VCOML can be a ground voltage. In addition, the switch circuit 360 can be located in an integrated circuit (IC).

The switch circuit 360 can further include a first switch 362 and a second switch 364. The first switch 362 is connected to the output of the third operational amplifier 330. The second switch 364 couples the first switch 362 to the second end of the capacitor 340 through the resistor R during the normal operation of the display, and couples one of the high constant voltage VCOMH and the low constant voltage VCOML to the second end of the capacitor through the resistor R during the power saving operation of the display.

During the normal operation of the display, the first switch 362 switches to turn on, and the second switch 364 switches to connect the output of the third operational amplifier 330 and the second end of the capacitor 340 through the first switch 362 and the resistor R. At that moment, the switch unit 350 is turned on to couple the output of the second operational amplifier 320 to the first end of the capacitor 340, such that the common voltage VCOM, which is provided for the panel 302, consists of the voltages VCOMC and VCOMDC.

During the power saving operation of the display, the first switch 362 switches to turn off, and the second switch 364 switches to couple one of the high constant voltage VCOMH and the low constant voltage VCOML to the node Q through the resistor R. At that moment, the switch unit 350 is turned off to decouple the output of the second operational amplifier 320 from the first end of the capacitor 340, such that only one of the high constant voltage VCOMH and the low constant voltage VCOML is provided as the common voltage VCOM for the panel 302 of the display. Furthermore, the second switch 364 can be set to switch to the high constant voltage VCOMH when the polarity signal M is at the high level and set to switch to the low constant voltage VCOML when the polarity signal M is at the low level.

For the foregoing embodiments of the present invention, the circuit can successfully provide an alternating-current (AC) common voltage for the panel during the normal operation of the display, and provide a constant voltage used as the common voltage for the panel during the power saving operation of the display. Therefore, the display driven by the AC common voltage can be operated well in the power saving state during the frame inversion for reducing the power consumption.

As is understood by a person skilled in the art, the foregoing preferred embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A circuit for providing a common voltage for a panel of a display, comprising:

a first operational amplifier for outputting a first voltage;

a second operational amplifier configured to be powered by the first voltage and to receive a polarity signal to output a second voltage;

a third operational amplifier for outputting a third voltage;

a capacitor having a first end coupled to an output of the second operational amplifier and a second end coupled to an output of the third operational amplifier; and a switch circuit coupling the second end of the capacitor to the panel during a normal operation of the display and coupling one of a high constant voltage and a low constant voltage to the panel during a power saving operation of the display.

2. The circuit as claimed in claim 1, wherein the switch circuit further comprises:

a first switch connected to the second end of the capacitor; and a second switch coupling the first switch to the panel during the normal operation of the display and coupling one of the high constant voltage and the low constant voltage to the panel during the power saving operation of the display.

3. The circuit as claimed in claim 2, wherein during the power saving operation of the display, the first switch switches to turn off and the second switch switches to one of the high constant voltage and the low constant voltage as the common voltage.

4. The circuit as claimed in claim 1, wherein the high constant voltage is a power supply voltage.

5. The circuit as claimed in claim 1, wherein the low constant voltage is a ground voltage.

6. The circuit as claimed in claim 1, wherein the first operational amplifier is connected to a first digital-to-analog converter and receives a first analog voltage output from the first digital-to-analog converter.

7. The circuit as claimed in claim 1, wherein the third operational amplifier is connected to a second digital-to-analog converter and receives a second analog voltage output from the second digital-to-analog converter.

8. The circuit as claimed in claim 1, wherein the second voltage output from the second operational amplifier is alternated in accordance with the polarity signal.

9. The circuit as claimed in claim 1, wherein the third voltage is a direct-current voltage.

10. The circuit as claimed in claim 1, wherein the high constant voltage is the first voltage output from the first operational amplifier.

11. The circuit as claimed in claim 1, wherein the low constant voltage is the third voltage output from the third operational amplifier.

12. The circuit as claimed in claim 1, wherein the switch circuit is located in an integrated circuit.

13. A circuit providing a common voltage for a panel of a display, comprising:

a first operational amplifier for outputting a first voltage;

a second operational amplifier powered by the first voltage and receiving a polarity signal to output a second voltage;

a capacitor having a first end and a second end, wherein the second end of the capacitor is coupled to the panel;

a switch unit coupling an output of the second operational amplifier to the first end of the capacitor during a normal operation of the display and decoupling the output of the second perational amplifier from the first end of the capacitor during a power saving operation of the display;

a third operational amplifier for outputting a third voltage; and a switch circuit coupling an output of the third operational amplifier to the second end of the capacitor during the normal operation of the display and coupling one of a high constant voltage and a low constant voltage to the second end of the capacitor during the power saving operation of the display.

14. The circuit as claimed in claim 13, wherein the switch circuit further comprises:

a first switch connected to the output of the third operational amplifier; and a second switch coupling the first switch to the second end of the capacitor during the normal operation of the display and coupling one of the high constant voltage and the low constant voltage to the second end of the capacitor during the power saving operation of the display.

15. The circuit as claimed in claim 14, wherein during the power saving operation of the display, the first switch switches to turn off and the second switch switches to one of the high constant voltage and the low constant voltage.

16. The circuit as claimed in claim 13, wherein the high constant voltage is a power supply voltage.

17. The circuit as claimed in claim 13, wherein the low constant voltage is a ground voltage.

18. The circuit as claimed in claim 13, wherein the first operational amplifier is connected to a first digital-to-analog converter and receives a first analog voltage output from the first digital-to-analog converter.

19. The circuit as claimed in claim 13, wherein the third operational amplifier is connected to a second digital-to-analog converter and receives a second analog voltage output from the second digital-to-analog converter.

20. The circuit as claimed in claim 13, wherein the second voltage output from the second operational amplifier is alternated in accordance with the polarity signal.

21. The circuit as claimed in claim 13, wherein the third voltage is a direct-current voltage.

22. The circuit as claimed in claim 13, wherein the switch circuit is located in an integrated circuit.

* * * * *